US009599146B2

(12) United States Patent
Nagaoka et al.

(10) Patent No.: US 9,599,146 B2
(45) Date of Patent: Mar. 21, 2017

(54) VEHICLE INCLUDING AN OPERATING MEMBER

(71) Applicant: YAMAHA HATSUDOKI KABUSHIKI KAISHA, Iwata-shi, Shizuoka (JP)

(72) Inventors: Masaki Nagaoka, Shizuoka (JP); Yasushi Aoki, Shizuoka (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 28 days.

(21) Appl. No.: 14/694,765

(22) Filed: Apr. 23, 2015

(65) Prior Publication Data

US 2015/0377281 A1 Dec. 31, 2015

(30) Foreign Application Priority Data

Jun. 26, 2014 (JP) ................... 2014-131609

(51) Int. Cl.
*A47C 7/62* (2006.01)
*F16C 1/10* (2006.01)
(Continued)

(52) U.S. Cl.
CPC ...... *F16C 1/10* (2013.01); *B62J 1/00* (2013.01); *B62J 1/12* (2013.01); *B62J 7/02* (2013.01);
(Continued)

(58) Field of Classification Search
CPC .... F16C 1/10; F16C 1/102; F16C 1/12; F16C 1/226; F16C 1/262; B62J 7/02; B62J 2099/0046
(Continued)

(56) References Cited

U.S. PATENT DOCUMENTS 3,727,943 A * 4/1973 Augunas ................ B60R 22/04
280/803
4,392,538 A * 7/1983 Goertzen ............. B62D 51/001
16/437
(Continued)

FOREIGN PATENT DOCUMENTS

DE 10046189 A1 4/2002
EP 1 808 366 A2 7/2007
(Continued)

OTHER PUBLICATIONS

Extended European Search Report dated Jul. 13, 2015.

*Primary Examiner* — Laurie K Cranmer
(74) *Attorney, Agent, or Firm* — Rabin & Berdo, P.C.

(57) ABSTRACT

Provided is a vehicle including a vehicle body. The vehicle includes an operating member to be pressed so that the operating member performs an operation, and a wire having a first end and a second end. The first end is closer than the second end to the operating member. The vehicle includes a wire cover slidably covering the wire and slidable relative to the wire. The vehicle includes an actuating section that supports a first portion of the wire cover and that moves the wire cover in a direction away from the first end of the wire in accordance with the operation. The vehicle includes a non-actuating section supporting the first end so that an operation amount of the first end with respect to the vehicle body is smaller than an operation amount of the actuating section with respect to the vehicle body when the operating member performs the operation.

19 Claims, 7 Drawing Sheets

(51) Int. Cl.
*F16C 1/26* (2006.01)
*B62J 7/02* (2006.01)
*B62J 1/00* (2006.01)
*B62J 1/12* (2006.01)
*F16C 1/12* (2006.01)
*E05B 79/20* (2014.01)
*B62J 99/00* (2009.01)

(52) U.S. Cl.
CPC ............... *F16C 1/12* (2013.01); *F16C 1/262* (2013.01); *B62J 2099/0046* (2013.01); *B62K 2202/00* (2013.01); *E05B 79/20* (2013.01)

(58) Field of Classification Search
USPC .......................... 297/188.08, 188.09, 188.13
See application file for complete search history.

(56) References Cited

U.S. PATENT DOCUMENTS

| | | | | |
|---|---|---|---|---|
| 4,929,007 A * | 5/1990 | Bartczak | ................ | E05B 83/36 292/216 |
| 5,094,315 A * | 3/1992 | Taki | ....................... | B62K 19/46 180/219 |
| 6,398,271 B1 * | 6/2002 | Tomaszewski | ......... | E05B 81/06 292/201 |
| 2004/0124686 A1 * | 7/2004 | Malsch | ................ | B60N 2/4885 297/410 |
| 2010/0268133 A1 * | 10/2010 | Samain | ................ | B60N 2/0232 601/100 |
| 2012/0175927 A1 * | 7/2012 | Parker | ...................... | B60N 2/12 297/311 |
| 2013/0320736 A1 * | 12/2013 | Teufel | ................... | B60N 2/366 297/383 |
| 2014/0203570 A1 * | 7/2014 | Nass | ...................... | E05B 79/20 292/196 |

FOREIGN PATENT DOCUMENTS

| | | |
|---|---|---|
| FR | 2555333 A1 | 5/1985 |
| GB | 294337 A | 7/1928 |
| GB | 347205 A | 4/1931 |
| JP | 2007-176239 A | 7/2007 |
| TW | M302866 | 4/1997 |
| TW | M277674 U | 10/2005 |
| TW | I359089 B | 3/2012 |
| TW | I391286 B | 4/2013 |
| TW | I399311 B | 6/2013 |

\* cited by examiner

VEHICLE INCLUDING AN OPERATING MEMBER

This application is based on, and claims priority to, Japanese Patent Application No. 2014-131609, filed on Jun. 26, 2014 the contents of which is incorporated herein by reference.

TECHNICAL FIELD

The present invention relates to a vehicle including a mechanism that moves an in-vehicle component by operation of a wire.

BACKGROUND ART

Vehicles having an open and close portion which is openable and closeable by operation of a wire have been known. For example, Japanese Patent Application Laid-open No. 2007-176239 (hereinafter, referred to as "PTL 1") discloses a vehicle having a seat and a filler opening lid which are openable and closeable by operation of two wires, respectively.

The unlocking operation disclosed in PTL 1 is as follow. First, pressing one end (56a) of a swingable seesaw-structured operating arm (56: see FIG. 10A of PTL 1) causes an operating arm (63) to turn and press an abutment portion (65a) to turn first driving arm (65) and pull a wire (80a). Subsequently, pulling the wire (80a) causes an engaging pin (34: see FIG. 5 of PTL 1) to move and unlock a lid lock structure (90). Note that, PTL 1 discloses an operation to unlock a seat lock as well.

CITATION LIST

Patent Literature

PTL 1
Japanese Patent Application Laid-Open No. 2007-176239

SUMMARY OF INVENTION

Technical Problem

The vehicle disclosed in PTL 1, however, requires a mechanism that converts the operation to press the operating arm into the operation to pull the wire because the wire is pulled by pressing the operating arm. For this reason, there arises a problem in that the mechanism that operates the wire is likely to increase in size.

An object of the present invention is a vehicle that downsizes the mechanism that operates a wire.

Solution to Problem

A vehicle according to an aspect of the present invention (hereinafter, referred to as "vehicle according to a first aspect") includes: an operating member to be pressed for operation; a wire including one end disposed closer to the operating member than another end of the wire; a wire cover that slidably covers the wire; an actuating section that supports a portion of the wire cover and that moves the wire cover in a direction away from the one end of the wire in accordance with the operation of the operating member; and a non-actuating section that supports the one end of the wire so that an operation amount of the one end of the wire with respect to a vehicle body is smaller than an operation amount of the actuating section when the operating member is operated.

Advantageous Effects of Invention

The present inventors have studied mechanisms other than the mode that changes a pressing operation into a pulling operation. Employing an operation arm to be pulled by hand for the purpose of pulling a wire does not require any conversion from a pressing operation into a pulling operation, thus making the structure simple. Such an operation arm to be pulled by hand, however, requires two operations including an operation to hold the operation arm and an operation to pull the operation arm, which degrades operability compared with the structure in which to press the operation arm. Thus, the present inventors have focused their attention to the wire structure. Wires are provided with wire covers that cover the outside of wires in order to prevent the wires from being in contact with and rubbed by another component during operation of the wires. The present inventors have noticed that, when the wire is puled, the wire cover moves relatively in a direction opposite to the direction in which the wire is pulled when viewed from the wire. Thus, the present inventors have found that operating the wire cover in a direction opposite to the direction in which the wire is pulled, i.e., pressing the wire cover in the direction opposite to the direction in which the wire is pulled, while the wire is fixed to the vehicle body frame causes one end of the wire and one end of the wire cover to relatively operate in the same manner as the related art. With this finding, the present inventors have made the present invention.

The present invention is to move the wire cover in a direction away from the one end of the wire in accordance with the operation of an operating member and provides a structure in which to press the wire cover. Accordingly, the present invention does not require any mechanism that changes the operation to press the operating member into the operation to pull the wire, and thus can downsize the mechanism that operates the wire. Moreover, the present invention can suppress degradation of operability compared with the case where the operating member is pulled, because the wire can be pulled by pressing the operating member. As described above, according to the vehicle of the present invention, the mechanism that operates the wire can be downsized, and degradation of operability can be suppressed.

The present invention may employ the following aspects.

A vehicle of a second aspect employs a configuration in which the vehicle according to the first aspect further includes one or more supporting sections that support the wire cover to the vehicle body, in which the supporting section supports a region of the wire cover that is closer to the other end of the wire than the portion of the wire cover supported by the actuating section, and at least one of the supporting sections fixes the wire cover to the vehicle body.

According to the second aspect, the one or more supporting sections that support the wire cover to the vehicle body support a region of the wire cover that is closer to the other end of the wire than the portion of the wire cover supported by the actuating section, and at least one of the supporting sections fixes the wire cover to the vehicle body. Thus, the position of the wire with respect to the vehicle body between the portion of the wire cover supported by the actuating section and the supporting section that fixes the wire cover to the vehicle body does not easily change. When the position of the wire changes with respect to the vehicle body, how the wire and the wire cover deform when the actuating section is operated changes. Thus, the operation load required for operating the actuating section changes. Suppression of a change in the position of the wire with respect to the vehicle body makes it possible to suppress a change in the operation load. In other words, the operational feeling can be stabilized.

A vehicle of a third aspect employs a configuration in which, in the vehicle according to the second aspect, among the one or more supporting sections, a supporting section that is closest in a distance along the wire to the portion of the wire cover supported by the actuating section fixes the wire cover to the vehicle body.

According to the third aspect, among the supporting sections, a supporting section that is closest in a distance along the wire to the portion of the wire cover supported by the actuating section fixes the wire cover to the vehicle body. Thus, the position of the wire with respect to the vehicle body between the portion of the wire cover supported by the actuating section and the supporting section that fixes the wire cover to the vehicle body does not easily change. When the position of the wire changes with respect to the vehicle body, how the wire and the wire cover deform when the actuating section is operated changes. Thus, the operation load required for operating the actuating section changes. Suppression of a change in the position of the wire with respect to the vehicle body makes it possible to suppress a change in the operation load. In other words, the operational feeling can be stabilized.

A vehicle of a fourth aspect employs a configuration in which, the vehicle according to the first aspect further includes one or more supporting sections that support the wire cover to the vehicle body, in which the supporting section supports a region of the wire cover that is closer to the other end of the wire than the portion of the wire cover supported by the actuating section, and the wire cover bends the wire between the portion of the wire cover supported by the actuating section and a supporting section that is closest in a distance along the wire to the portion of the wire cover supported by the actuating section among the one or more supporting sections.

According to the fourth aspect, the one or more supporting sections that support the wire cover support a region of the wire cover that is closer to the other end of the wire than the portion of the wire cover supported by the actuating section, and the wire cover bends the wire between the portion of the wire cover supported by the actuating section and a supporting section that is closest in a distance along the wire to the portion of the wire cover supported by the actuating section among the one or more supporting sections. Thus, in a case where the wire is to be operated by pressing the wire cover, bending the wire or changing the degree of the curvature between the portion of the wire cover supported by the actuating section and a region of the wire cover close to the other end of the wire enables operation of the wire. Moreover, bending the wire in advance makes it easier to bend the wire, which reduces the operation load of the operating member and makes it possible to stabilize an operational feeling.

A vehicle of a fifth aspect employs a configuration in which, in the vehicle according to the fourth aspect, the supporting section that is closest in a distance along the wire to the portion of the wire cover supported by the actuating section among the one or more supporting sections fixes the wire cover to the vehicle body.

According to the fifth aspect, the supporting section that is closest in a distance along the wire to the portion of the wire cover supported by the actuating section among the one or more supporting sections fixes the wire cover to the vehicle body. Thus, in a case where the wire is to be operated by pressing the wire cover, bending the wire or changing the degree of the curvature between the portion of the wire cover supported by the actuating section and a region of the wire cover close to the other end of the wire enables operation of the wire. Moreover, bending the wire in advance makes it easier to bend the wire, which reduces the operation load of the operating member and makes it possible to stabilize an operational feeling.

A vehicle of a sixth aspect employs a configuration in which, in the vehicle according to the fourth or the fifth aspect, the supporting section that is closest in a distance along the wire to the portion of the wire cover supported by the actuating section among the one or more supporting sections is shifted from an actuation axis of the actuating section in a direction perpendicular to the actuation axis.

According to the sixth aspect, the supporting section that is closest in a distance along the wire to the portion of the wire cover supported by the actuating section among the one or more supporting sections is shifted from an actuation axis of the actuating section in a direction perpendicular to the actuation axis. Accordingly, the wire can be easily bent and supported. In addition, the bent wire can be easily controlled in a direction opposite to a direction in which the wire cover moves, by operation of the operating member.

A vehicle of a seventh aspect employs a configuration in which the operating member is a sliding operating member in the vehicle of any one of the first to the sixth aspects.

According to the seventh aspect, the sliding operating member is provided for every single wire, so that, even when the number of wires to be operated increases, the number of operating members may be increased for the number of wires. Thus, a design in accordance with the number of wires is made possible, which improves the design freedom.

DESCRIPTION OF EMBODIMENT

Hereinafter, an embodiment of the present invention will be described in detail with reference to the accompanying drawings.

Embodiment

Figure 1:
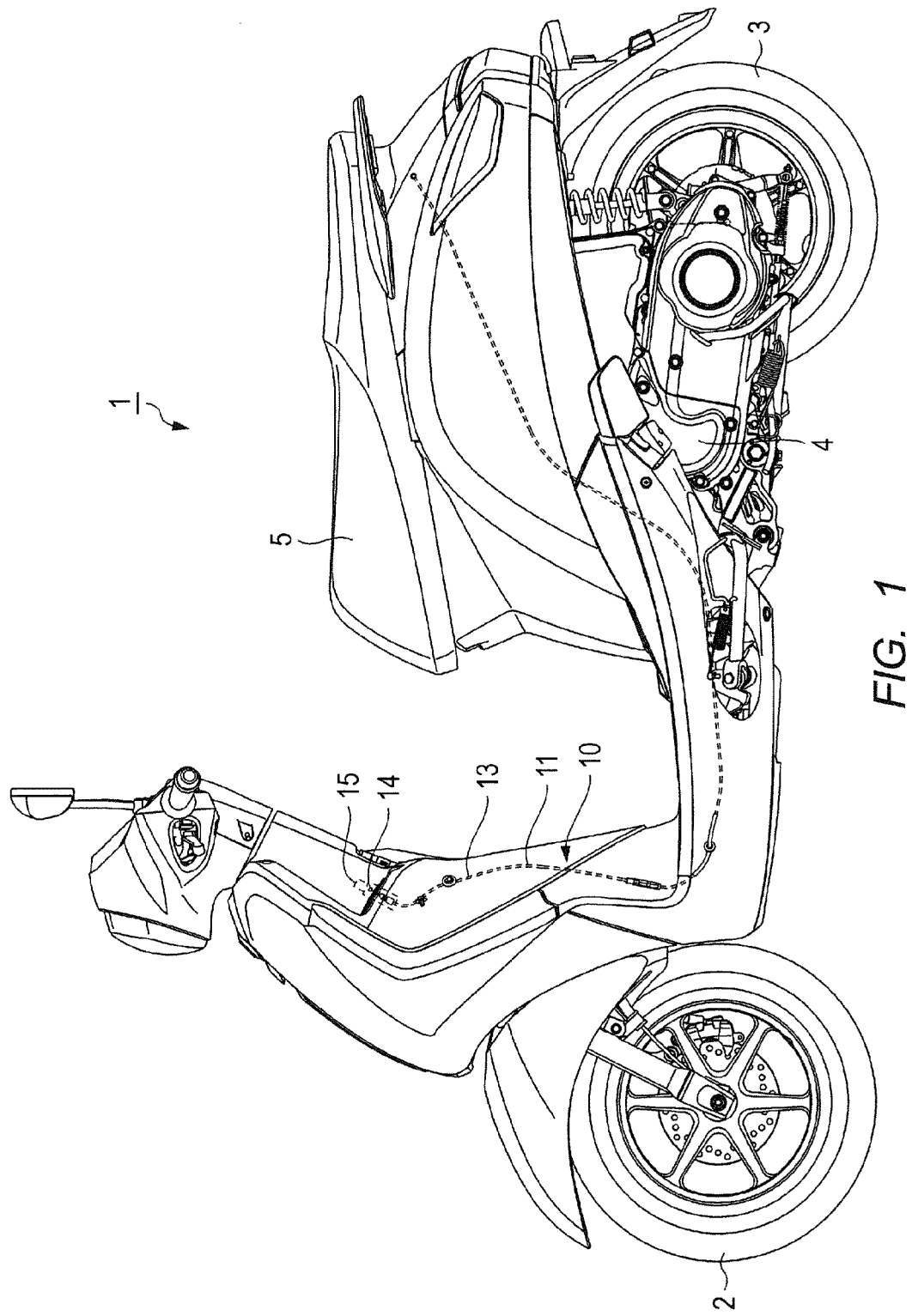
FIG. 1 is a side view of a motorcycle according to an embodiment of the present invention.
Figure 2:
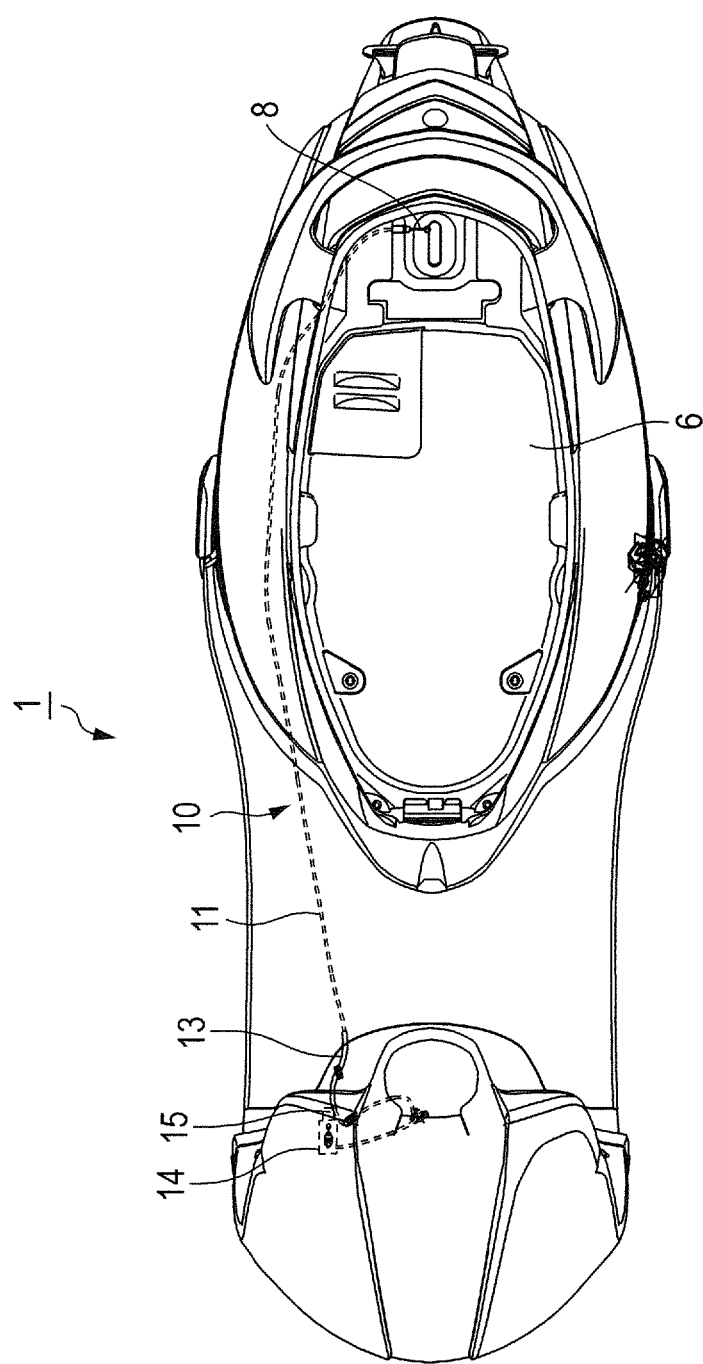
FIG. 2 is a top view of the motorcycle according to the embodiment of the present invention.

FIG. 1 is a side view of motorcycle 1 according to an embodiment of the present invention. FIG. 2 is a top view of motorcycle 1 according to the embodiment of the present invention. Note that, FIG. 2 illustrates a state of motorcycle 1 in which the steering handle, front wheel, seat and the like have been removed. Motorcycle 1 according to the embodiment is a so-called scooter-type motorcycle Motorcycle 1 mainly includes front wheel 2, rear wheel 3, engine 4 and seat 5, for example, and storage box 6 is disposed under seat 5. Storage box 6 is used for storing a helmet, for example, and is formed of an open-top box shape.

Seat 5 also serves as a lid for opening and closing the top opening of storage box 6. Seat lock bar 7 (see FIG. 3) for closing the top opening of storage box 6 using seat 5 is provided under seat 5.

Figure 3:
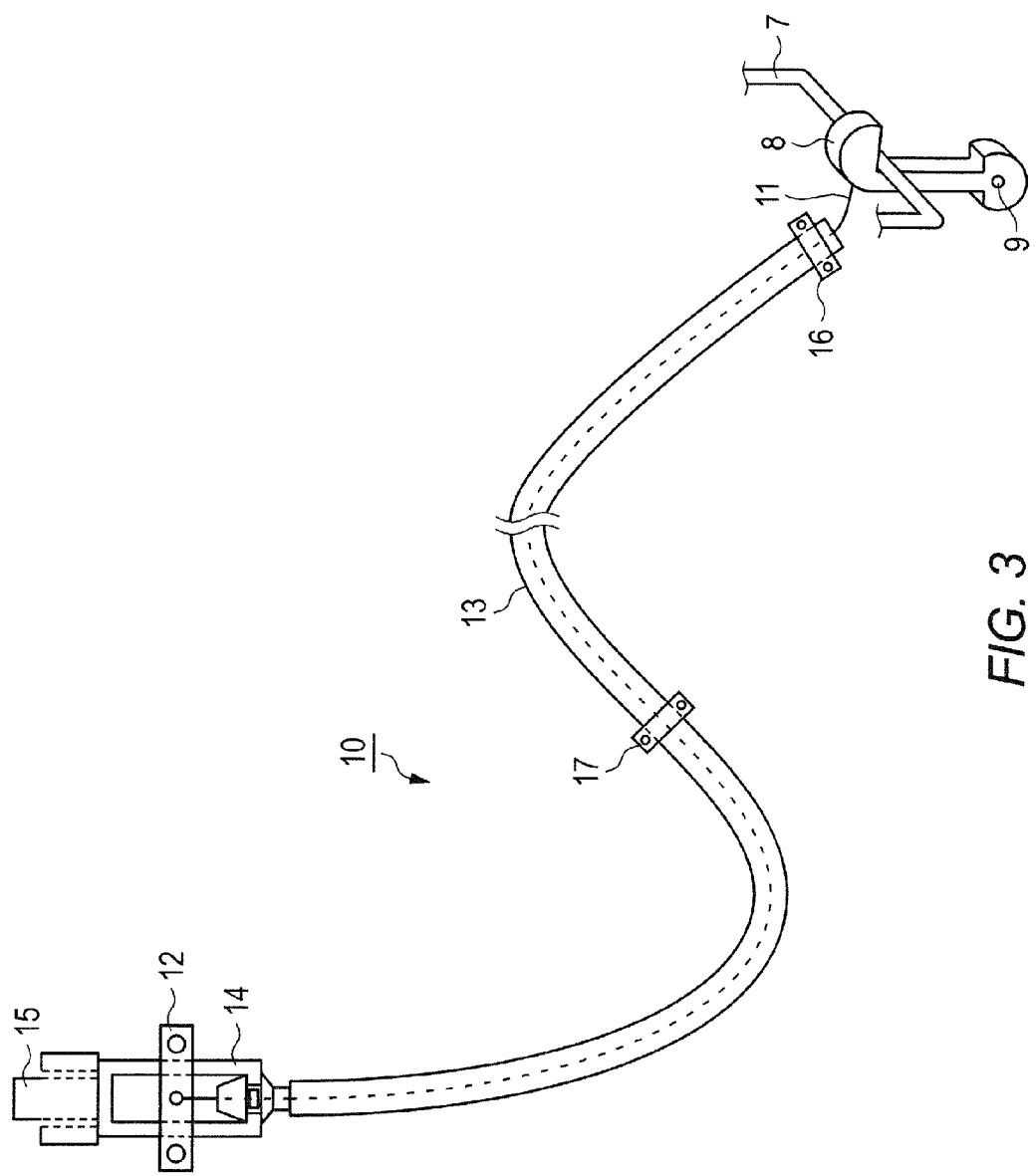
FIG. 3 is a schematic diagram of a wire-lock unlocking mechanism.

Hook 8 is provided at a position on a vehicle body side that faces seat lock bar 7 in a state where seat 5 closes the top opening of storage box 6, and configured to lock seat lock bar 7 (see FIG. 3). Hook 8 is turnable around hinge 9 (see FIG. 3) within a certain range. However, a spring is connected to hook 8, so that hook 8 stays at a certain orientation because of the elastic force of the spring when no external force acts on hook 8. Meanwhile, when seat 5 is opened or closed, an external force greater than the elastic force of the spring acts on hook 8, so that hook 8 turns around hinge 9.

Motorcycle 1 includes wire-lock unlocking mechanism 10 for unlocking the locked seat 5. Wire-lock unlocking mechanism 10 includes wire 11, non-actuating section 12, wire cover 13, actuating section 14, operation button 15 (which may also referred to as an "operating member"), and supporting sections 16 and 17. Hereinafter, wire-lock unlocking mechanism 10 will be described with reference FIG. 3.

In wire-lock unlocking mechanism 10, one end of wire 11 (which may also be referred to as a "first end") is supported by non-actuating section 12 while the other end of wire 11 (which may also be referred to as a "second end") is connected to hook 8. In addition, wire 11 is slidably covered by wire cover 13.

Actuating section 14 is provided to one end of wire cover 13 near the one end of wire 11 supported by non-actuating section 12. Operation button 15 is connected to actuating section 14. Note that, operation button 15 may be in contact with actuating section 14. In addition, supporting sections 16 and 17 that support wire cover 13 are provided at the other end and an optional position of wire cover 13, respectively, and fix wire cover 13 to the vehicle body.

Non-actuating section 12 supports the one end of wire 11 so that the operation amount of the one end of wire 11 with respect to the vehicle body (that is, the operation amount of the one end of the wire 11 is a distance that the one end of the wire 11 moves with respect to the vehicle body) becomes smaller than the operation amount of actuating section 14 (that is, the operation amount of the actuating section 14 is a distance the actuating section 14 moves with respect to the vehicle body) when the operation to press the operation button 15 is performed. Non-actuating section 12 is fixed to the vehicle body. However, non-actuating section 12 may not be fixed to the vehicle body, and may be movably supported in this case as long as the operation amount is smaller than actuating section 14.

Supporting section 17 is provided at a position closest in a distance along wire 11 to actuating section 14 and disposed at a position different from an actuation axis which may extend for an infinite distance of actuating section 14 in a direction perpendicular to the actuation axis. Accordingly, wire 11 can be easily bent and supported. In addition, bent wire 11 can be easily controlled in a direction opposite to a direction in which wire cover 13 moves, by the operation to press operation button 15.

Actuating section 14 supports the one end of wire cover 13 and also moves wire cover 13 in a direction away from the one end of wire 11 supported by non-actuating section 12, in accordance with the operation to press operation button 15.

The position of wire 11 with respect to the vehicle body does not easily change between the one end of wire cover 13 supported by actuating section 14 and supporting section 17 that fixes wire cover 13 to the vehicle body. When the position of wire 11 with respect to the vehicle body changes, how wire 11 and wire cover 13 deform when actuating section 14 is operated changes. Accordingly, the operation load required to operate actuating section 14 changes. Suppressing such a change in the position of wire 11 with respect to the vehicle body enables suppressing a change in the operation load, which in turn, makes it possible to stabilize an operational feeling.

Wire 11 is bent between the one end of wire cover 13 supported by actuating section 14 and supporting section 17. In a case where wire 11 is to be operated by pressing wire cover 13, bending wire 11 or changing the degree of the curvature between the portion of wire cover 13 supported by actuating section 14 and a region of wire cover 13 close to the other end of wire 11 enables operation of wire 11. Moreover, bending wire 11 in advance makes it easier to bend wire 11, which reduces the operation load of operation button 15 and makes it possible to stabilize an operational feeling.

Note that, operation button 15 becomes available (i.e., can be pressed) when a key (not illustrated) is inserted into a key cylinder (not illustrated) or when the key lock is unlocked. This configuration is provided for security purpose.

Figure 4:
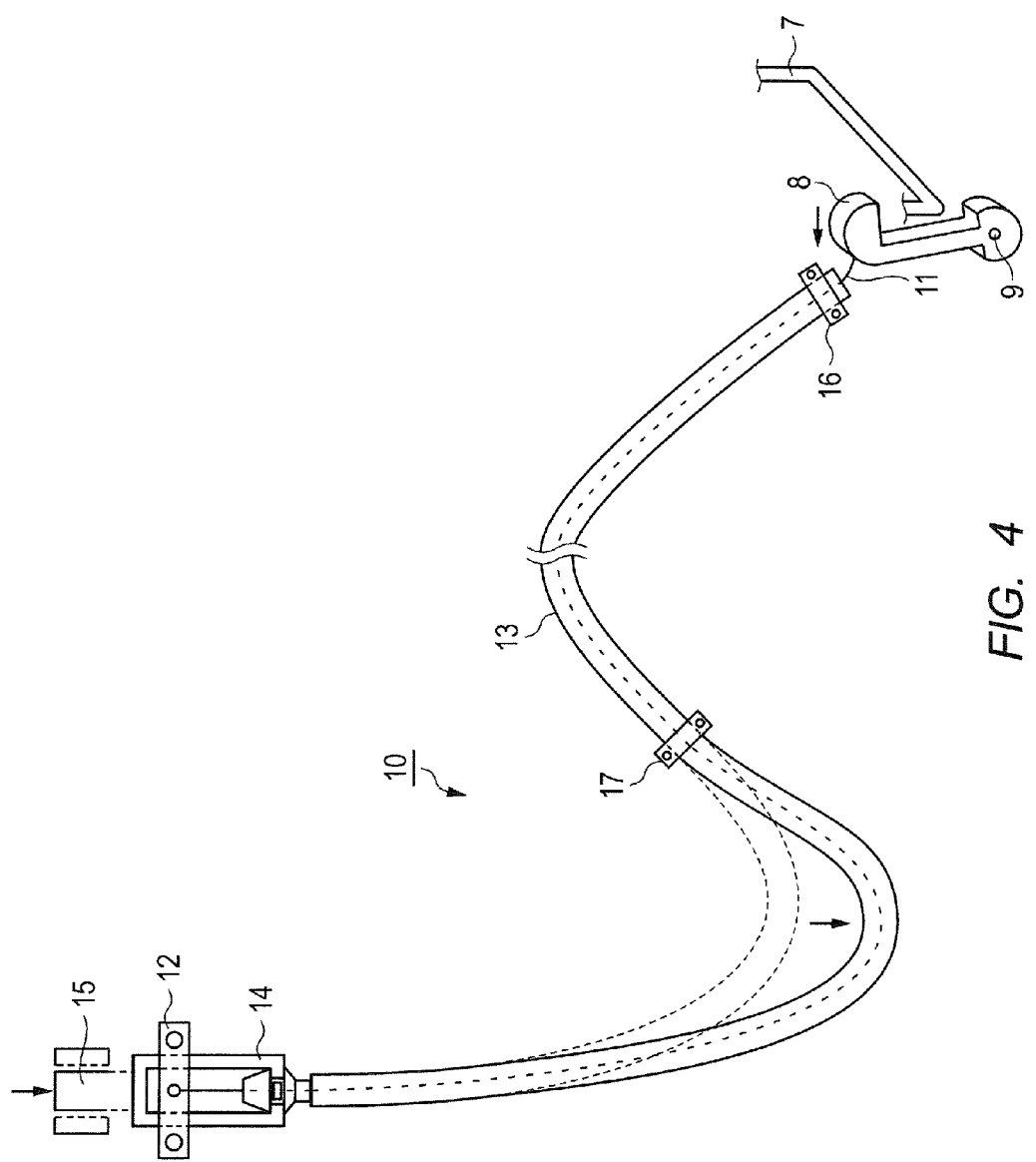
FIG. 4 is a diagram for describing an operation of the wire-lock unlocking mechanism.

Next, an operation of wire-lock unlocking mechanism 10 will be described using FIG. 4. When operation button 15 is pressed, actuating section 14 connected to operation button 15 moves wire cover 13 in a direction away from the one end of wire 11 in accordance with the operation to press operation button 15. At this time, actuating section 14 moves wire cover 13 so that the operation amount of wire cover 13 with respect to the vehicle body is larger than that of wire 11.

Since wire cover 13 is fixed to the vehicle body by supporting section 17, the degree of curvature of wire cover 13 moved by actuating section 14 increases between actuating section 14 and supporting section 17.

Since the one end of wire 11 is supported by non-actuating section 12, the other end of wire 11 is pulled by wire cover 13 whose degree of curvature has increased between non-actuating section 14 and supporting section 17, and turns hook 8 connected to the other end of wire 11. Hook 8 removes a latch from seat lock bar 7 and thus can unlock.

As described above, according to the embodiment, supporting the one end of wire 11 by non-actuating section 12 and moving wire cover 13 by actuating section 14 in a direction away from the one end of wire 11 in accordance with the operation to press operation button 15 makes it possible to pull the other end of wire 11. Thus, provision of a mechanism that converts a pressing operation into a pulling operation is no longer required, and the mechanism that operates the wire can be downsized. In addition, pressing operation button 15 makes it possible to pull wire 11, so that degradation of operability can be suppressed as compared to a case where an operation lever is pulled, for example.

An embodiment of the present invention has been described thus far.

Figure 5:
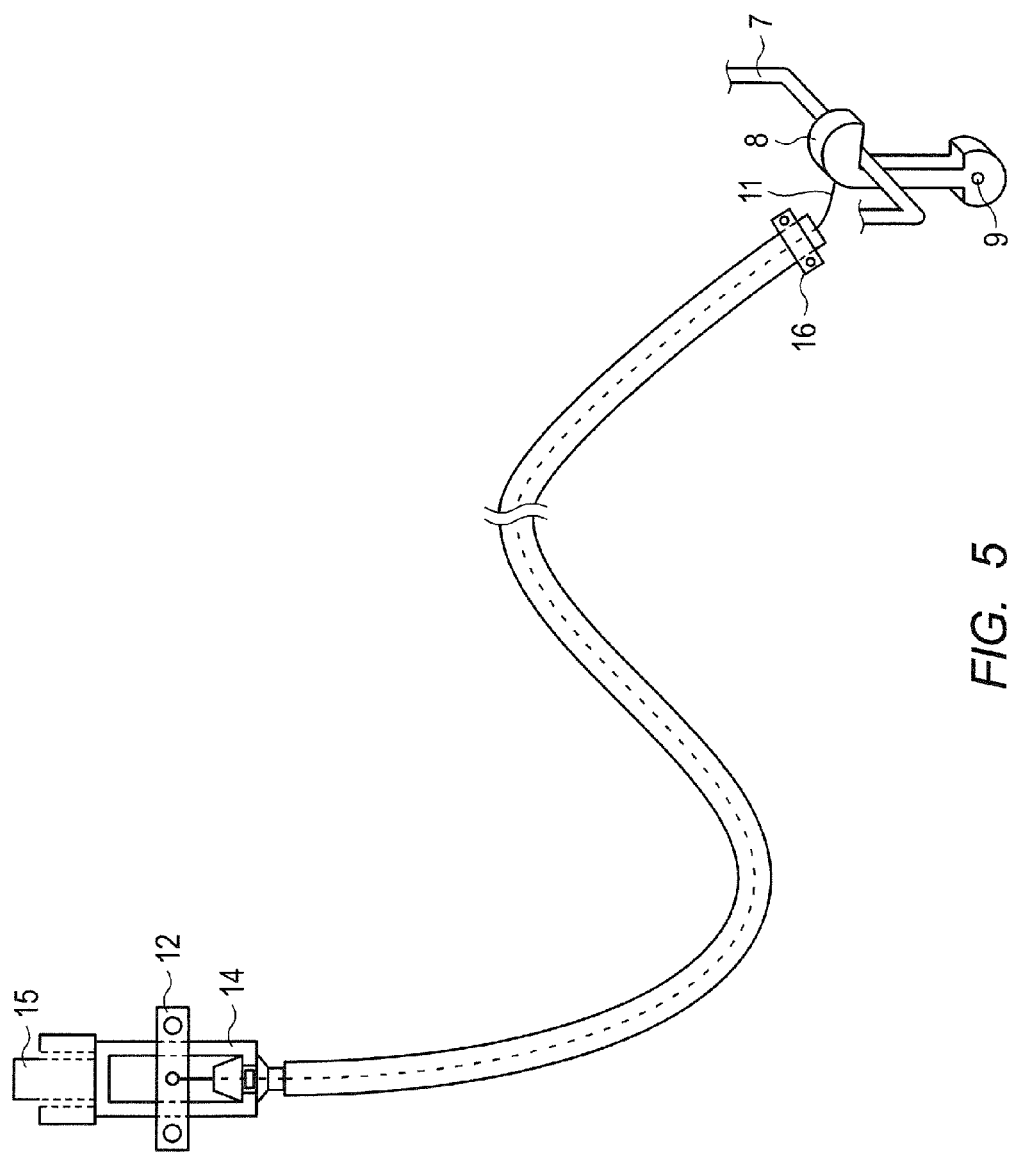
FIG. 5 is a diagram illustrating how a supporting section fixes a wire cover to a vehicle body.

Note that, the embodiment has been described using the case where supporting portions 16 and 17 are provided at the other end and an optional position of wire cover 13, respectively, and fix wire cover 13 to the vehicle body. However, the present invention is not limited to this case. For example, as illustrated in FIG. 5, a configuration may be employed in which at least one supporting section 16 supports a region of wire cover 13 near the other end of wire cover 13 and fixes wire cover 13 to the vehicle body.

Figure 6:
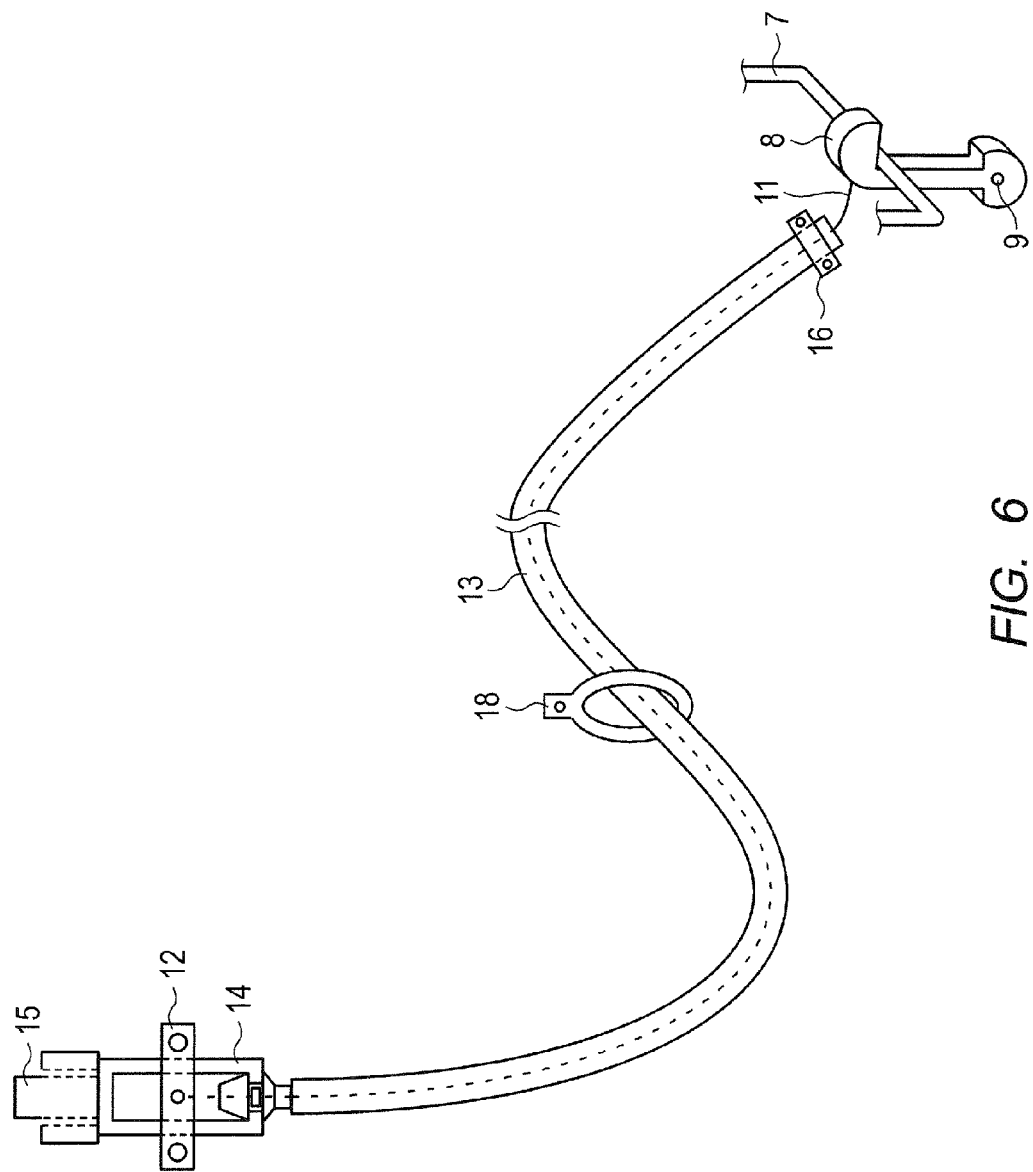
FIG. 6 is a diagram illustrating how supporting sections support the wire cover.

Moreover, as illustrated in FIG. 6, supporting section 18 may be employed that regulates large movement of wire cover 13 while allowing for certain movement of wire cover 13, instead of fixing wire cover 13 to the vehicle body, for example.

Figure 7:
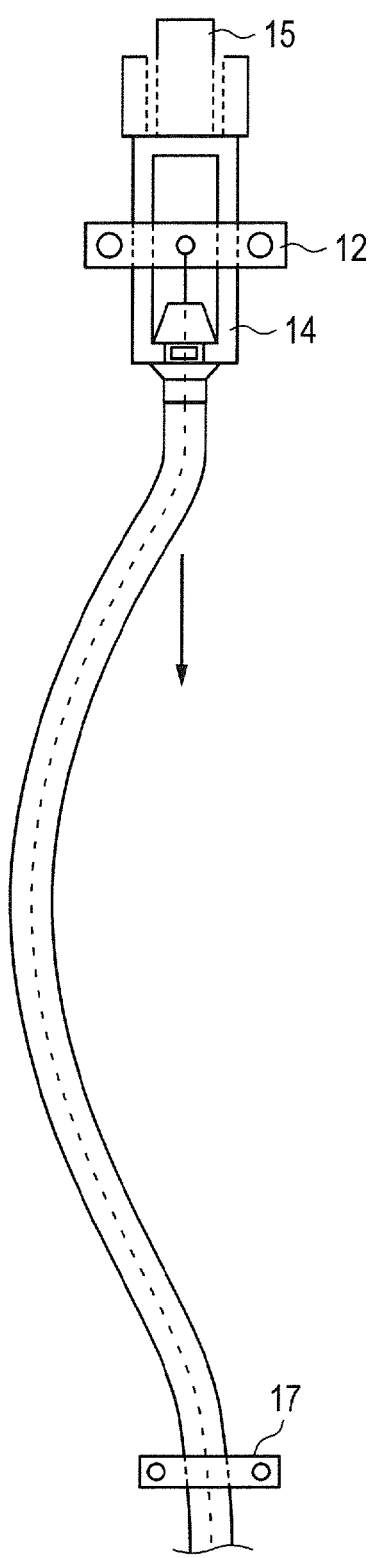
FIG. 7 is a diagram illustrating a position of the supporting section which is closest to an actuating section.

Furthermore, the embodiment has been described using the case where supporting section 17 which is closest to actuating section 14 is disposed at a position different from the actuation axis of actuating section 14 in a direction perpendicular to the actuation axis. The present invention is not limited to this case, however, and as illustrated in FIG. 7, supporting section 17 which is closest to actuating section 14 may be placed on the actuation axis of actuating section 14.

In addition, the embodiment has been described using the case where wire cover 13 extending from actuating section 14 to supporting section 17 which is closest to actuating section 14 is bent. The present invention is not limited to this case, however, and wire cover 13 extending from actuating section 14 to supporting section 17 which is closest to actuating section 14 may be straight.

In addition, the embodiment has been described using the operation button, which is a sliding operating member, as an example. The sliding operating member may have a knob and allow the user to slide the knob in a direction to press the actuating section. The sliding operating member is provided for every single wire, so that, even when the number of wires to be operated increases, the number of operating members may be increased for the number of wires. Thus, a design in accordance with the number of wires is made possible, which improves the design freedom.

Moreover, the operating member may be a seesaw operating member (also called "rocker operating member") other than the sliding operating member. The seesaw operating member includes first and second operation sections and turns around a shaft disposed between the first and the second operation sections. When one of the operation sections that is raised and available (i.e., can be pressed) is pressed, the other operation section is raised and becomes available (i.e., can be pressed). Accordingly, when a seesaw operating member is used, the actuating section of the wire-lock unlocking mechanism is connected to the available operation section (i.e., can be pressed) in an actuatable manner.

In addition, the embodiment has been described using the case where a seat lock is unlocked. However, the present invention is applicable to unlocking a filler neck lid as well, for example.

INDUSTRIAL APPLICABILITY

The present invention is applicable to automobiles including a two-wheeled vehicle, three-wheeled vehicle and truck, for example, and also to a snowmobile (snow vehicle) and the like.

The invention claimed is:

1. A vehicle comprising:
a vehicle body;
an operating member to be pressed so that the operating member performs an operation;
a wire having a first end and a second end, the first end being closer than the second end to the operating member;
a wire cover that slidably covers the wire and is slidable relative to the wire, the wire cover having a first portion that is closer to the first end than to the second end;
an actuating section that supports the first portion of the wire cover and that moves the wire cover in a direction away from the first end of the wire in accordance with the pressing of the operating member; and
a non-actuating section that supports the first end of the wire so that an operation amount of the first end of the wire with respect to the vehicle body is smaller than an operation amount of the actuating section with respect to the vehicle body when the operating member is pressed,
wherein the actuating section and the non-actuating section are configured to pull the second end of the wire to move the second end of the wire when the wire cover is moved in the direction away from the first end of the wire in accordance with the pressing of the operating member.

2. The vehicle according to claim 1, further comprising at least one supporting section that supports the wire cover to be supported on the vehicle body, wherein
the at least one supporting section supports a second portion of the wire cover,
the second portion being disposed a first distance, measured along the wire, from the second end of the wire,
the second portion being disposed a second distance, measured along the wire, from the first portion,
the first distance is less than the second distance, and
one or more of the at least one supporting section fixes the wire cover to the vehicle body.

3. The vehicle according to claim 2, wherein, among the at least one supporting section, a closest supporting section is closest, in distance measured along the wire, to the first portion of the wire cover supported by the actuating section, further wherein the closest supporting section fixes the wire cover to the vehicle body.

4. The vehicle according to claim 1, further comprising at least one supporting section that supports the wire cover to be supported on the vehicle body, wherein
the at least one supporting section supports a second portion of the wire cover,
the second portion being disposed a first distance, measured along the wire, from the second end of the wire,
the second portion being disposed a second distance, measured along the wire, from the first portion of the wire cover,
the first distance is less than the second distance, and
the wire cover bends the wire between the first portion of the wire cover and a closest supporting section of the at least one supporting section that is closest in distance, measured along the wire, to the first portion.

5. The vehicle according to claim 4, wherein the closest supporting section fixes the wire cover to the vehicle body.

6. The vehicle according to claim 4, wherein the closest supporting section is disposed at a position different from an actuation axis of the actuating section, the position further being in a direction perpendicular to the actuation axis.

7. The vehicle according to claim 1, wherein the operating member is a sliding operating member.

8. The vehicle according to claim 1, wherein during the pressing of the operating member, the first end of the wire remains fixed by the non-actuating section so as to remain stationary.

9. The vehicle according to claim 1, wherein during the pressing of the operating member, a closest portion of the wire cover to the first end of the wire moves away from the first end of the wire and the non-actuating section.

10. The vehicle according to claim 9, wherein the closest portion of the wire cover is the first portion of the wire cover.

11. The vehicle according to claim 1, wherein the operation amount of the first end of the wire with respect to the vehicle body corresponds to a distance that the first end moves with respect to the vehicle body, and the operation amount of the actuating section with respect to the vehicle body is the amount that the actuating section moves with respect to the vehicle body.

12. The vehicle according to claim 1, further comprising a supporting section that supports and holds the wire cover, wherein during the pressing of the operating member, the actuating section moves the wire cover while the wire cover is held by the supporting section so that a degree of curvature of the wire cover increases.

13. The vehicle according to claim 12, further comprising:
a seat for a user to sit upon;
a storage box for storing items underneath the seat;
a seat lock bar connected with the seat; and
a hook connected to the wire so that the hook is moved by the wire between
a first position where the hook catches the seat lock bar to hold seat lock bar and lock the seat in a sitting position to cover the storage box, and
a second position where the hook does not catch the seat lock bar so that the seat is unlocked and is movable into an open position to expose the storage box.

14. The vehicle according to claim 13, wherein during the pressing of the operating member, the wire moves the hook from the first position to the second position.

15. The vehicle according to claim 13, wherein when the hook is in the first position, the storage box is inaccessible by the user.

16. A vehicle comprising:
a vehicle body;
a pressable operating member that is pressed so that the operating member performs an operation;
a wire having a first end disposed proximate the operating member and a second end disposed distal to the operating member;
a wire cover slidably covering the wire so as to be slidable relative to the wire, the wire cover having a portion that is closer to the first end than to the second end;
an actuating section that supports the portion of the wire cover and that moves the wire cover in a direction away from the first end of the wire in response to the operating member being pressed; and
a non-actuating section supporting the first end of the wire so that the actuating section and the wire cover each move away from the first end in response to the operating member being pressed,
wherein the actuating section and the non-actuating section are configured to pull the second end of the wire to move the second end of the wire when the wire cover is moved in the direction away from the first end of the wire in accordance with the pressing of the operating member.

17. The vehicle according to claim 16, further comprising:
a seat for a user to sit upon;
a storage box for storing items underneath the seat;
a seat lock bar connected with the seat; and
a hook connected to the wire so that the hook is moved by the wire between
a first position where the hook catches the seat lock bar to hold the seat lock bar and lock the seat in a sitting position to cover the storage box, and
a second position where the hook does not catch the seat lock bar so that the seat is unlocked and is movable into an open position to expose the storage box.

18. The vehicle according to claim 17, wherein during the pressing of the operating member, the wire moves the hook from the first position to the second position.

19. The vehicle according to claim 17, wherein when the hook is in the first position, the storage box is inaccessible by the user.

* * * * *